April 16, 1940.  J. H. MOLLER  2,197,560

SHEET GLASS CUTTING APPARATUS

Filed May 26, 1938  4 Sheets-Sheet 1

Inventor
JOHN H. MOLLER.

By Frank Fraser
Attorney

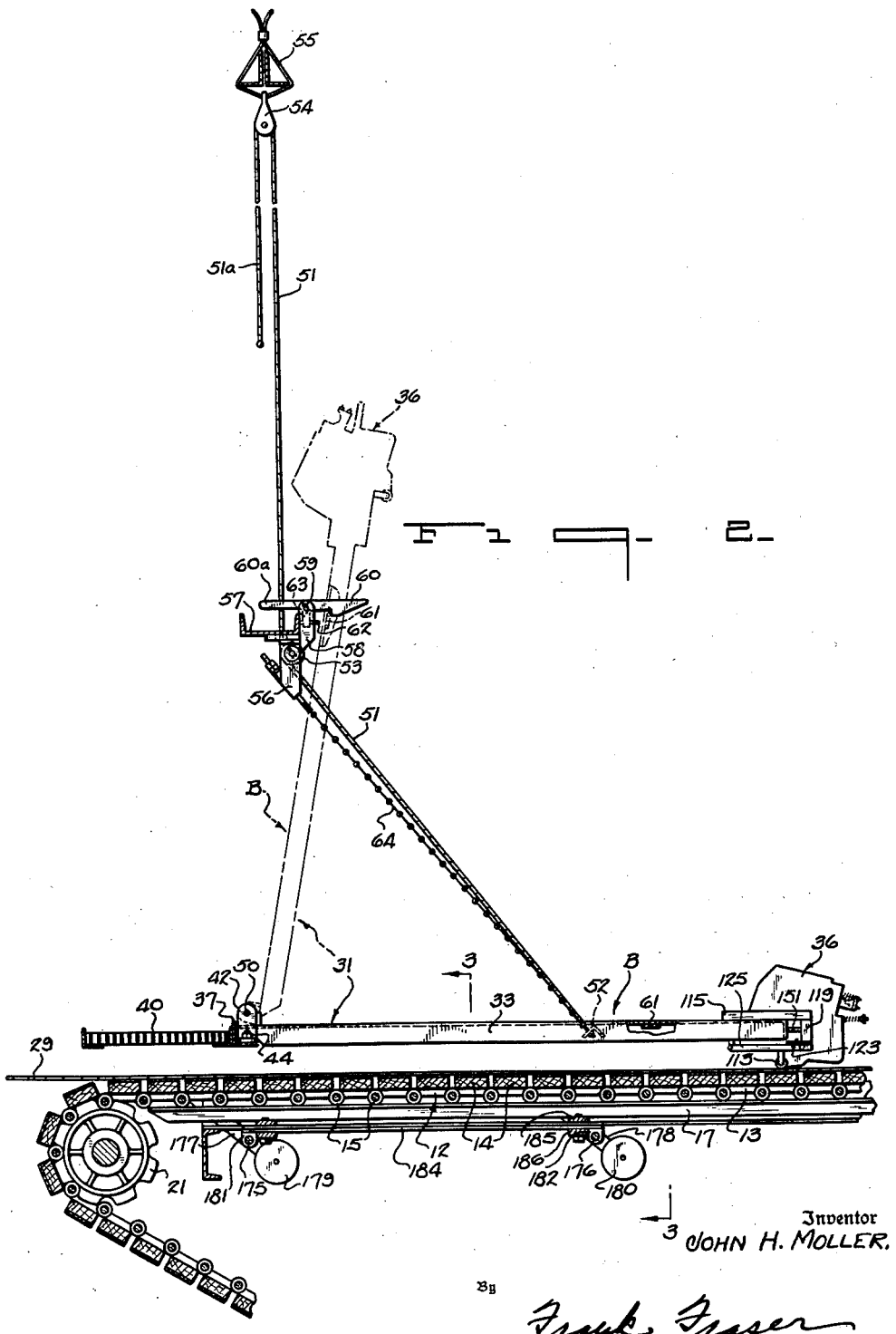

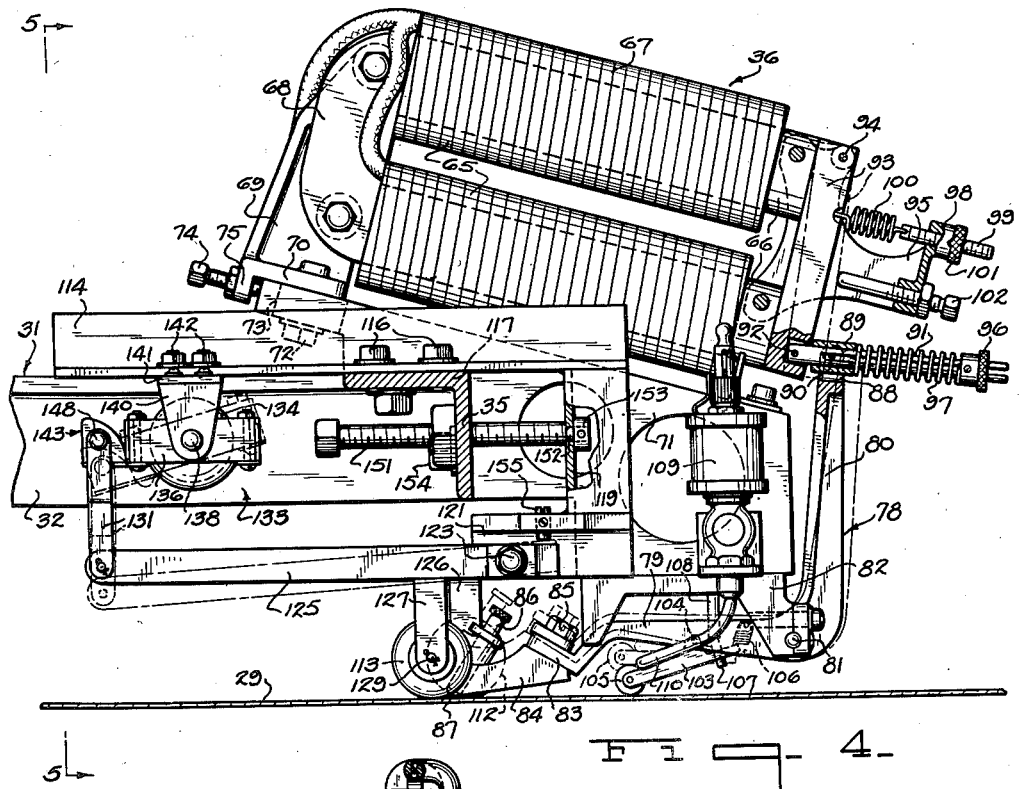

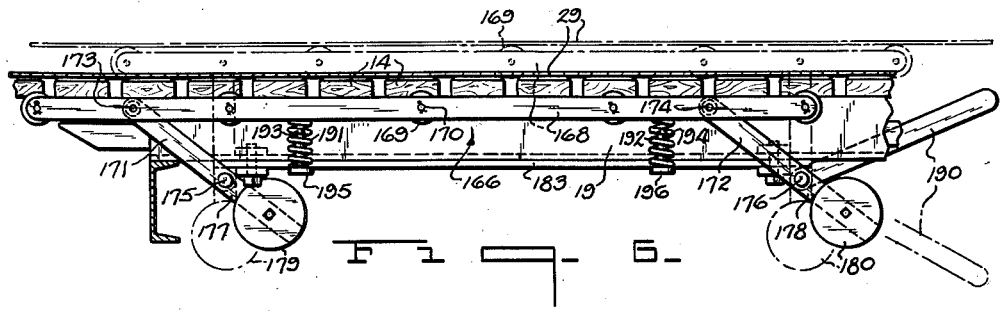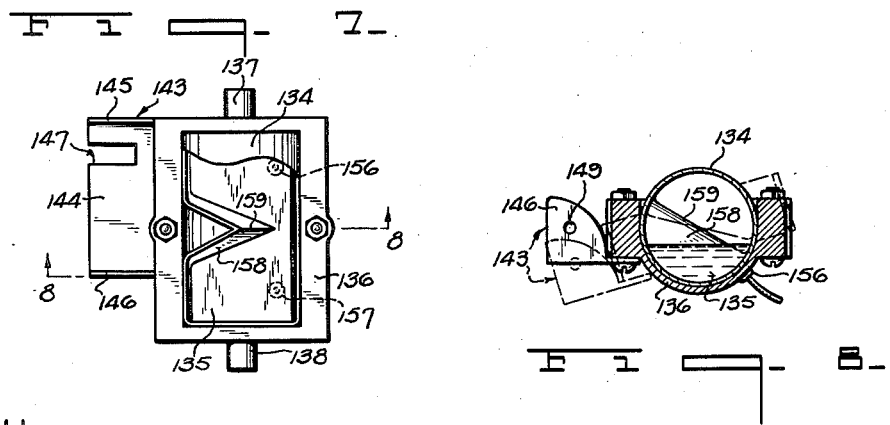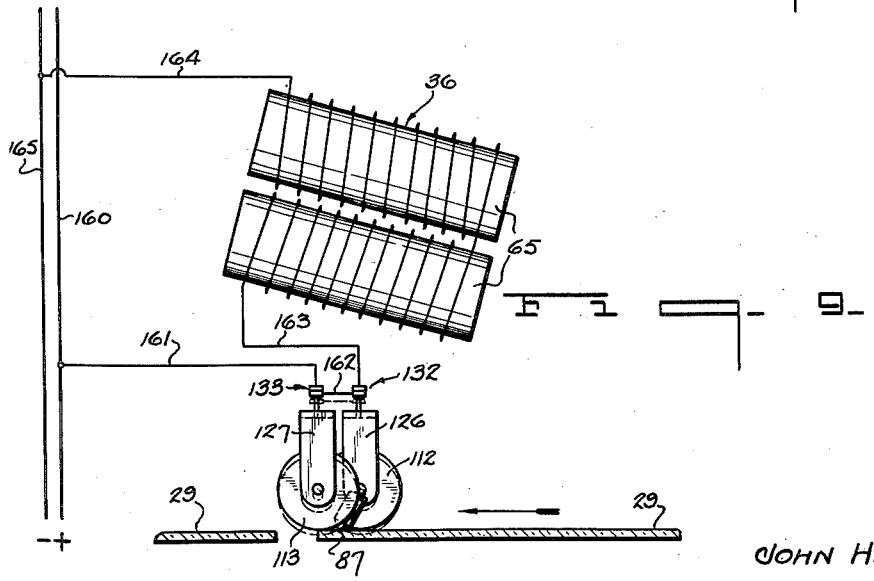
Inventor
JOHN H. MOLLER.
By Frank Fraser
Attorney

Patented Apr. 16, 1940

2,197,560

UNITED STATES PATENT OFFICE 2,197,560

SHEET GLASS CUTTING APPARATUS

John H. Moller, Charleston, W. Va., assignor to Libbey-Owens-Ford Glass Company, Toledo, Ohio, a corporation of Ohio Application May 26, 1938, Serial No. 210,111

8 Claims. (Cl. 33—32)

The present invention relates broadly to the art of glass cutting and more particularly to improved apparatus for cutting sheet glass after it has been annealed.

An important object of the invention is the provision of improved apparatus for cutting a continuous or substantially continuous sheet or ribbon of glass as it emerges from an annealing leer into sections of a predetermined size suitable for handling and is of particular utility in the cutting of very thin glass which cannot be handled safely in large sheets.

Another important object of the invention is the provision of improved cutting apparatus of the above character embodying means for first cutting the continuous or substantially continuous sheet or ribbon of glass transversely into individual sheets of the desired length, in combination with means for subsequently automatically splitting the said sheets longitudinally as they are carried forwardly.

A further important object of the invention is the provision of cutting mechanism of novel construction for splitting the individual sheets longitudinally, including a cutting element having associated therewith feeler means, actuated by the forward movement of the sheets, for bringing said cutting element into contact with each sheet at a point back of the front edge thereof and for moving the said cutting element out of engagement with the sheet just before it reaches the back edge, whereby to protect the cutting element against injury by being struck by the forward edge of the glass as well as eliminating chipping and spalling of the sheet edges.

Other objects and advantages of the invention will become more apparent during the course of the following description, when taken in connection with the accompanying drawings.

In the drawings, wherein like numerals are employed to designate like parts throughout the same:

Fig. 2 is a vertical longitudinal section taken substantially on line 2—2 of Fig. 1 and showing in side elevation the cutting mechanism for splitting the glass sheets longitudinally;

Fig. 4 is a vertical longitudinal section taken substantially on line 4—4 of Fig. 1 and showing in side elevation, the cutting unit and associated parts of the longitudinal cutting mechanism;

Fig. 5 is an end view of the longitudinal cutting unit and associated parts taken substantially on line 5—5 of Fig. 4;

Fig. 6 is a vertical longitudinal section taken substantially on line 6—6 of Fig. 3 and showing in side elevation one of the breaking units for cracking the glass after it has been cut longitudinally.

Fig. 7 is a plan view, partially broken away, of one of the tiltable mercury switches forming a part of the cutter actuating means;

Fig. 8 is a transverse section of the mercury switch taken substantially on line 8—8 of Fig. 7; and Fig. 9 is an electrical diagram illustrating the operation of the longitudinal cutting mechanism.

Figure 1:
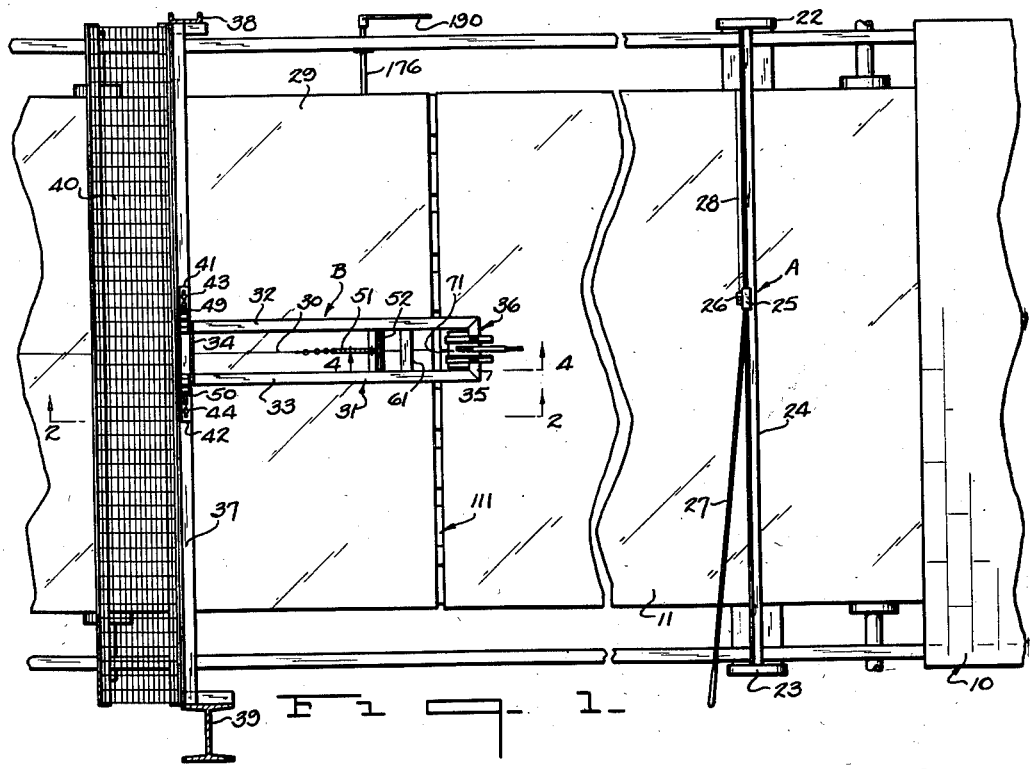
Fig. 1 is a plan view of cutting apparatus constructed in accordance with the invention.

Referring now to the drawings, the numeral 10 designates the outlet end of a horizontal annealing leer of any conventional or preferred construction, and 11 a continuous or substantially continuous sheet or ribbon of glass emerging therefrom. Positioned closely adjacent the outlet end of the leer, in a manner to receive the glass sheet or ribbon therefrom and carry it forwardly, is a traveling cutting or capping table 12, which moves in the same direction as the sheet or ribbon 11 but preferably at a relatively faster speed for a purpose which will be more clearly hereinafter apparent.

The capping table 12 may take a variety of forms but is here shown, by way of example, as comprising a plurality of spaced parallel endless chains 13 carrying a series of wooden blocks 14 which form in the upper run of the chains a flat, even supporting surface for the glass. Each chain 13 is provided with the two series of rollers 15 and 16 (Fig. 3) which travel in their upper run on the fixed horizontal supporting tracks 17 and 18 respectively carried by the longitudinally extending angle beams 19 and 20. The endless chains 13 are trained at each end of their loop about a sprocket or the like 21 and one of the sprockets may be positively driven in any preferred manner to move the table 12 in the proper direction and at the desired speed.

As the ribbon of glass 11 emerges from leer 10 upon capping table 12, it is adapted to be first cut transversely into individual sheets of the desired length by the cutting mechanism designated in its entirety by the letter A after which the said sheets are adapted to be split longitudinally by the cutting mechanism designated generally by the letter B. The transverse cutting mechanism A may be of any conventional or approved construction but is preferably of the general type disclosed in the patent to J. L. Drake, No.

1,724,261, granted August 13, 1929, and is adapted for movement with the glass during the transverse scoring thereof whereby to permit accurate cuts to the end that the ribbon of glass can be cut transversely either to size or substantially to size.

The transverse cutting mechanism herein disclosed embodies generally a pair of carriages 22 and 23 arranged at opposite sides of the endless capping table 12 and movable longitudinally thereof upon suitable tracks, not shown, but which are located beneath the upper horizontal run of said table. Extending transversely across the table and connecting the carriages 22 and 23 is a supporting cross member 24 upon which is slidably mounted a cutter carrier 25 carrying the cutter 26. The cutter carrier 25 and cutter 26 are movable along the cross member 24 by an operating rod 27 and upon drawing of the said cutter across and in contact with the glass 11, it is adapted to effect the scoring thereof as indicated at 28. The glass ribbon 11 is then broken along the score line 28 in the well known manner to provide individual sheet sections, one of which is shown at 29 in Fig. 1. Any suitable means may be employed for causing the cutting mechanism A to move with the glass during the scoring of the latter.

Figure 3:
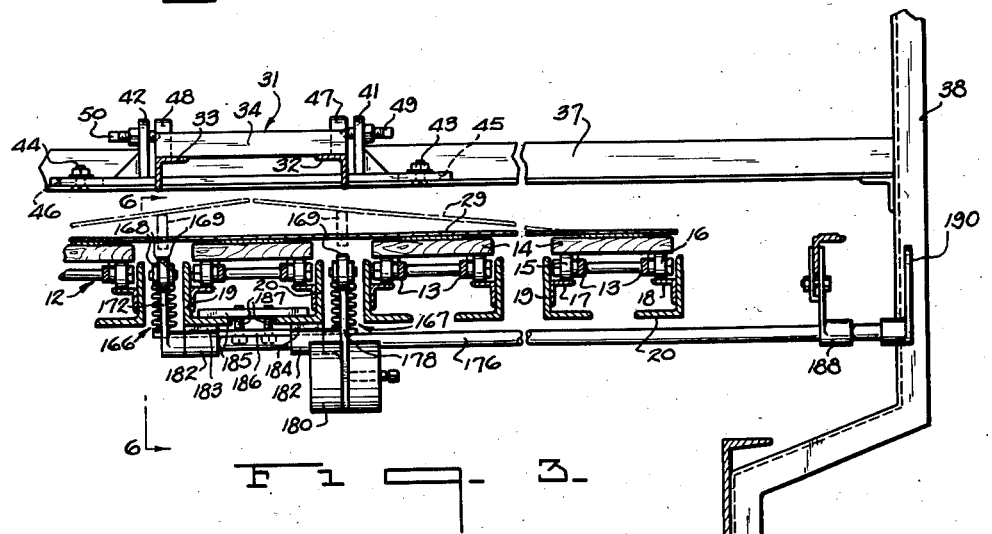
Fig. 3 is a vertical transverse section taken substantially on line 3—3 of Fig. 2.

As the individual sheets 29 of the desired length are cut by the transverse cutting mechanism A from the forward end of the continuous or substantially continuous ribbon 11, the said sheets are carried forwardly upon the capping table beneath the longitudinal cutting mechanism B which acts to score the said sheets longitudinally, intermediate the side edges thereof, as indicated at 30 in Fig. 1. The sheets are then adapted to be cracked along the score line 30, by apparatus to be more fully hereinafter described, to complete the splitting of said sheets. The longitudinal cutting mechanism B comprises a substantially horizontal rectangular supporting frame 31 including the longitudinally extending parallel side members 32 and 33 connected at their inner ends by the transverse end member 34 and at their outer ends by the transverse end member 35. As shown, the side members 32 and 33 and end member 35 consist preferably of angle beams, while the end member 34 may consist simply of a substantially flat plate secured upon the tops of said side members (Fig. 3).

Carried at the outer end of the supporting frame 31 is the cutting unit 36, which will be more fully hereinafter described, while the said supporting frame is pivotally associated at its inner end with a fixed transverse angle member 37 supported at its opposite ends by standards 38 and 39 and constituting a part of the walk 40 which extends across the capping table. Mounted upon the horizontal flange of the transverse angle member 37, at opposite sides of the transverse center of the capping table, are substantially L-shaped brackets 41 and 42 to which the supporting frame 31 of the longitudinal cutting mechanism B is pivoted. More specifically, the brackets 41 and 42 are secured to the transverse angle member 37 by bolts 43 and 44 which pass through slots 45 and 46 formed in the horizontal portions of said brackets 41 and 42 respectively so that the said brackets can be adjusted transversely of the capping table to the desired position. The inner end of the supporting frame 31 is received between the brackets 41 and 42, and the side members 32 and 33 of said frame are provided with ears 47 and 48 respectively which are pivotally connected with the said brackets by screws 49 and 50 inserted horizontally through the vertical portions of the said brackets.

With such a construction, the cutting unit 36 can be readily moved out of cutting position relative to the glass by swinging the supporting frame 31 upwardly upon the screws 49 and 50 as shown by the broken lines in Fig. 2. The means herein provided for raising and lowering the supporting frame 31 comprises a cable 51 attached at its lower end to an angle strip 52 carried by said frame and passing upwardly first about a freely rotatable roller 53 and then over a pulley 54 hung from a suitable support 55. The roller 53 is carried by a depending bearing bracket 56 secured to a stationary transverse channel beam 57 having an opening therein through which the cable 51 can pass. Carried by the channel beam 57 is a fixture 58 to which is pivoted, as at 59, a latch 60, the forward notched end of which is adapted to hook over a latch plate 61 carried by the supporting frame 31 when the said frame is in raised position.

When it is desired to raise the cutting mechanism B to its substantially vertical broken line position shown in Fig. 2, it is simply necessary for the operator, while standing upon the walk 40, to pull downwardly on the free end 51a of cable 51 which will swing the cutting mechanism upwardly, and this movement is continued until the latch 60 drops over the latch plate 61 whereupon the cutting mechanism will be locked in raised position. When it is desired to again lower the cutting mechanism, it is simply necessary for the operator to push downwardly upon the inner end 60a of latch 60 thereby moving the said latch out of engagement with latch plate 61. At this time, the operator should of course have a firm grip on cable 51 so as to prevent the cutting mechanism from falling too rapidly. The outer end of the latch 60 is prevented from dropping too far downwardly upon lowering of the cutting mechanism by a set screw 62 passing transversely through a lug 63 formed on said latch and engaging the adjacent vertical flange of the channel beam 57. When the cutting mechanism is in its lowered horizontal position, it is supported by a chain 64 attached at its lower end to the angle strip 52 and at its upper end to the bearing bracket 56.

The longitudinal cutting unit 36 is of the electrically operated type, such as disclosed in the patent to E. A. Rosin, No. 2,022,739 granted December 3, 1935, and includes a pair of relatively thin electromagnets 65 positioned one above the other and each consisting of a metal core 66 about which is wound the usual coil 67. The cores 66 of the electromagnets form a customary horseshoe magnet by being integral with a connecting member 68 which is secured to a bracket 69, said bracket being provided with an inclined base portion 70 which is adapted to rest upon a supporting block 71 and be secured thereto by a bolt or the like 72 which passes through a slot 73 in supporting block 71. The position of the electromagnets 65 upon the block 71 can be adjusted, upon loosening of the bolt 72, by means of a set screw 74 passing through an ear 75 formed on the bracket 69 and engaging supporting block 71. The supporting block 71 for the cutting unit is secured to the end member 35 of supporting frame 31 by vertical and horizontal bolts or other suitable fastening elements 76 and 77 respectively (Fig. 5).

The cutting unit 36 also includes a substantially L-shaped lever 78 comprising a substantially horizontal tool supporting arm 79 and a substantially vertical arm 80, said lever being pivotally mounted intermediate its ends upon a horizontal pin 81 carried by the depending leg 82 of supporting block 71.

The horizontal tool supporting arm 79 of lever 78 is provided with an offset foot 83 and removably carried thereby is a shoe 84 secured to said foot by a screw or the like 85. Carried at the outer end of said shoe is a cutting ferrule 86 provided at its lower end with a cutting diamond 87, although a rotatable steel cutting wheel may be used if preferred.

The upper end of the vertical arm 80 of lever 78 is bifurcated to provide spaced ears 88 which straddle a sleeve 89, being pivotally secured thereto by a pin 90. The sleeve 89 is slidably mounted upon a split bolt 91 pivoted at its inner end as at 92 to a metal bar or armature 93 which in turn has a pivotal mounting at its upper end, as at 94, with a bracket 95 fixedly carried by the cores 66 of the electromagnets 65. Threaded upon the outer end of the split bolt 91 is a nut 96 and encircling the bolt and bearing at one end against the sleeve 89 and at its opposite end against nut 96 is a compression spring 97 normally tending to urge the sleeve 89 and consequently the upper end of the lever arm 80 inwardly. The pin 90 passes loosely through the slot in the bolt 91.

Loosely received through the portion 98 of bracket 95 is a screw 99 having secured to its inner end a tension spring 100, the opposite end of said spring being connected to the bar 93 and acting to normally draw the said bar away from and out of engagement with the cores of the electromagnets as indicated by the broken lines in Fig. 4. A nut 101 is threaded upon the outer end of screw 99 to adjust the tension of spring 100. Also carried by bracket 95 is a stop screw 102 which serves to limit the outward movement of bar 93 about its pivot 94.

In practice, when the electromagnets 65 are energized, the bar 93 will be drawn inwardly thereby against the action of spring 100 and, of course, the inward movement of bar 93 will cause the lever 78 to be rocked in a counter-clockwise direction upon pin 81 which will effect a lowering of the cutting diamond 87 into cutting position. However, upon deenergization of the electromagnets, the spring 100 will function to swing the bar 93 outwardly so as to rock the lever 78 in a clockwise direction and raise the cutting diamond to a non-cutting position. The spring 97 serves to yieldably maintain the diamond in engagement with the glass during the cutting operation, while at the same time allowing a limited amount of rocking movement of the lever 78 to take care of any unevenness in the glass surface. In other words, the lever 78 is permitted a slight rocking movement even when the bar 93 is held inwardly by the electromagnets.

In order to facilitate the cutting operation and better the action of the cutting diamond or wheel 87, as the case may be, it is desirable to oil the glass sheet along the path to be traveled by the cutting tool. To this end, there is carried by the horizontal arm 79 of L-shaped lever 78 a leg 103 pivoted to said lever as at 104 and carrying at its outer end a roller 105 of felt or some other suitable material. The roller 105 is positioned in alignment with the cutting tool 87 and is adapted to engage the glass sheet when the said tool is lowered into cutting position, said roller running over the glass in advance of the cutter and oiling the same whereby to facilitate and better the cutting action thereof. The roller 105 is held in yieldable engagement with the glass sheet by a spring 106, while the downward movement thereof is limited by an adjustable set screw 107 carried by leg 103 and engaging a stop pin 108 carried by supporting block 71.

The pivot point 104 of leg 103 is so positioned with respect to roller 105 that when the cutting tool is lowered into cutting position, the roller will rest upon the glass, whereas when the cutter is raised into non-cutting position, the roller will also be raised upwardly out of contact with the glass as shown by the broken lines in Fig. 4; the said leg 103 being swung about its pivot 104 by engagement of the set screw 107 with stop pin 108. In order to supply the necessary oil to the roller 105, there is securely mounted on the supporting block 71 an oil cup 109 provided at its lower end with a flexible metal tube 110 in which is arranged a wick for conducting the oil from the cup 109 to the roller 105, said metal tube 110 being bent so that its outer end is positioned directly above roller 105.

As pointed out above, the endless capping table 12 is preferably driven at a relatively faster speed than the movement of the continuous sheet or ribbon of glass 11 issuing from the annealing leer 10 so that after a sheet section 29 (Fig. 1) has been cut from the free end of the glass ribbon, the said sheet 29 will be carried forwardly at a relatively faster rate than the ribbon with the result that a relatively narrow gap or space, shown at 111, will be provided between the adjacent ends of the sheet 29 and ribbon 11. In order to prevent the cutting diamond 87 from striking against the forward edge of each glass sheet cut from the glass ribbon 11 and being injured thereby and also in order to prevent spalling and chipping of the sheet edges by the cutter, means, generally referred to as feeler means, is herein provided for bringing the cutting diamond into contact with the glass sheet at a point back of the front edge thereof and for lifting the cutter from the glass just before it reaches the rear edge, said feeler means being automatically actuated by forward movement of the glass.

In accordance with the invention, the feeler means comprises two freely rotatable wheels 112 and 113, preferably provided with rubber tires or coverings so as not to injure the glass surface. The two wheels 112 and 113 are mounted for vertical movement at opposite sides of the cutting diamond 87 as shown in Fig. 5, and as illustrated in Figs. 4 and 9 are also offset horizontally with respect to one another longitudinally of the capping table so that the glass sheet engages first one wheel and then the other wheel. As shown in the drawings, the glass sheet 29 will first engage and raise wheel 112 and then wheel 113. Likewise, wheel 112 will be the first to leave the back edge of the sheet to be followed by wheel 113. The feeler wheels 112 and 113 are also horizontally adjustable longitudinally of the capping table so that the axes of rotation of the wheels will be disposed at opposite sides of the point of contact of the cutting diamond with the glass sheet. The said wheels are electrically connected with the electromagnets 65 so that upon raising and lowering of the wheels the said electromagnets will be successively energized and deenergized to automatically move the cutting diamond into and out of engagement with the glass sheet when it reaches a predetermined position with respect to the front and back edges thereof.

The means for mounting the feeler wheels 112 and 113 as well as the operation thereof will now be described in detail. Supported upon the end member 35 of the cutter supporting frame 31, and inwardly of the side members 32 and 33 thereof, are spaced parallel angle irons 114 and 115 secured in place by bolts or the like 116 which pass through slots 117 in said end member 35 so that the angle irons can be adjusted longitudinally. Carried by and depending from the angle irons 114 and 115 at the inner ends thereof are vertical members 118 and 119 respectively and carried at the lower ends thereof are horizontal brackets 120 and 121. Pivoted to the brackets 120 and 121 as at 122 and 123 are the inner ends of the longitudinally extending substantially horizontal lever arms 124 and 125 respectively, carrying yokes 126 and 127 in which are mounted the feeler wheels 112 and 113 respectively, rotatable about the horizontal axes 128 and 129. The lever arms 124 and 125 are pivotally connected at their outer ends by vertical links 130 and 131 to the tiltable mercury switches 132 and 133 respectively carried by the angle irons 114 and 115.

Each mercury switch 132 and 133 consists, as best shown in Figs. 7 and 8, of a relatively short tubular member 134 containing a supply of mercury 135 and carried in a tilting cradle 136 provided at its opposite ends with trunnions 137 and 138 rotatably supported in bearing straps 139 and 140 depending from a horizontal plate 141 secured to the respective angle iron 114 or 115 by bolts or the like 142. The cradle 136 carries at one side thereof a substantially U-shaped bracket 143 including a bottom 144 and two vertical side flanges 145 and 146, the bottom 144 having a slot 147 therein. The links 130 and 131 pivoted to the lever arms 124 and 125 pass upwardly through the slots 147 in the brackets 143 of the respective mercury switches 132 and 133 and are pivoted upon a transverse rod 148 passing through openings 149 in the side flanges 145 and 146.

As shown in Figs. 4 and 9, the axes of rotation of the feeler wheels 112 and 113 are disposed at opposite sides of the point of contact of the cutting diamond 87 with the glass sheet and in order to provide for independent horizontal adjustment of the wheels to properly position them with respect to the cutting diamond, there are provided adjusting screws 150 and 151 which are threaded horizontally through the end member 35 and are provided at their inner ends with reduced portions 152 which pass loosely through the vertical members 118 and 119 and have secured thereto collars 153. Upon rotation of the adjusting screws 150 and 151 the wheels 112 and 113 can be adjusted horizontally with respect to one another, said screws being held by lock nuts 154. The downward movement of feeler wheels 112 and 113 is limited by stop screws 155 threaded vertically through the brackets 120 and 121 and engaging the top of the lever arms 124 and 125 inwardly of their pivot points 122 and 123 as best shown in Fig. 4.

The mercury switches 132 and 133 are each provided with a pair of contacts 156 and 157 adjacent the opposite ends of the tubular member 134 and electrically connected with the electromagnets 65. The tubular member 134 is provided interiorly thereof and at a point intermediate its ends with a transverse V-shaped partition or baffle 158 terminating in a knife edge 159 which inclines upwardly from one side of said tubular member to the other. In the operation of this type of switch, when the tubular member 134 is in the position indicated in Fig. 8, the supply of mercury 135 will extend unbrokenly from one end to the opposite end thereof so as to engage both contacts 156 and 157 whereby to complete a circuit from one contact to the other. However, when the tubular member is tilted to the position shown in broken lines in Fig. 8, the supply of mercury will be divided by the baffle 158 and caused to flow to the opposite ends of said tubular member thereby breaking the circuit between the contacts 156 and 157.

With particular reference to Fig. 9, it will be seen that one of the contacts 156 and 157 of mercury switch 133 is connected with the positive main line 160 by a wire 161, while the other contact of said switch is connected with one of the contacts of mercury switch 132 by a wire 162. A wire 163 runs from the second contact of switch 132 to the electromagnets 65 which are in turn connected by a wire 164 to the negative main line 165 to complete the circuit through the electromagnets and mercury switches. With this arrangement, the electromagnets 65 will not be energized until both feeler wheels 112 and 113 have been moved upwardly by the glass to close both mercury switches 132 and 133. On the other hand, just as soon as one of the feeler wheels drops downwardly off of the glass to open one of said switches, the circuit through the electromagnets will be broken.

In operation, and assuming the glass is moving to the left as indicated by the arrow in Fig. 9, when the forward edge of the sheet 29 raises the feeler wheel 112 the mercury switch 132 will be closed but because mercury switch 133 is still open the electromagnets 65 will not be energized. However, upon continued movement of the glass sheet to raise the feeler wheel 113, the mercury switch 133 will also be closed and the circuit thereby completed through the electromagnets. When this occurs, the bar 93 of the cutting unit 36 will be drawn inwardly to swing the lever 78 in a counter-clockwise direction and thereby lower the cutting diamond 87 into engagement with the glass. Since the cutting diamond 87 has passed over the front edge of the glass sheet before the said sheet engages feeler wheel 113, the cutting diamond upon being lower will be brought into contact with the glass at a point back of the front edge thereof so that the danger of the diamond striking the front edge of the sheet and being injured thereby, as well as causing spalling and chipping of the sheet edge is prevented. Likewise, as the glass has been cut transversely and the individual sheet 29 moved forwardly and separated from the ribbon 11, the feeler wheel 112 will fall off the back edge of the sheet before the cutting diamond 87 reaches the said back edge and just as soon as wheel 112 moves downwardly, the mercury switch 132 will be automatically opened thereby deenergizing the electromagnets and causing the cutting diamond to be automatically returned to non-cutting position by the spring 100 drawing the bar 93 outwardly and swinging the lever 78 in a clockwise direction. Thus, by suitably adjusting horizontally the position of the feeler wheels 112 and 113 relative to the cutting diamond 87, the diamond can be brought into contact with the glass sheet at a point back of the front edge thereof and moved out of contact with the sheet at a point in front of the back edge.

After the glass sheet 29 has passed beneath the cutting unit 36 and been split longitudinally thereby, the said sheet is adapted to be cracked longitudinally along the score line 30 and for this purpose suitable breaking apparatus is mounted beneath the upper run of the capping table. With reference particularly to Figs. 2, 3, and 6, there is provided beneath the table and at opposite sides of the score line 30 the two breaking units 166 and 167, each comprising a pair of longitudinally extending strips 168 between which are arranged a plurality of freely rotatable breaking rollers 169 mounted upon pins 170. The strips 168 of breaking unit 166 are carried adjacent their opposite ends by levers 171 and 172 pivoted at their upper ends as at 173 and 174 to said strips and fixed at their lower ends upon transverse horizontal shafts 175 and 176 respectively.

The strips 168 of breaking unit 167 are carried adjacent their opposite ends by levers 177 and 178, said levers being pivoted at their upper ends to the said strips and fixed intermediate their ends upon the shafts 175 and 176 respectively, the lower ends of levers 177 and 178 carrying counterweights 179 and 180 which facilitate the raising of the breaking rollers. The shafts 175 and 176 are journaled in pairs of spaced bearings 181 and 182 respectively carried by longitudinally extending strips 183 and 184 clamped adjacent their opposite ends to one pair of angle members 19 and 20 by clamping plates 185 and 186 and screws 187. One of the shafts 175 or 176, and as here shown shaft 176 extends transversely to one side of the capping table, passing through a bearing 188, and provided at its outer end with an operating handle 190. With this construction, upon turning of the shaft 176, both breaking units 166 and 167 will be simultaneously raised and the rollers 169 thereof engaging the sheet 29 at opposite sides of the score line 30 will cause the said sheet to be lifted up and broken along the score line as indicated by the broken lines in Fig. 3. When the breaking rollers 169 are in lowered position, they are supported by compression springs 191 and 192 encircling vertical pins 193 and 194 carried by transverse plates 195 and 196 which extend between and are secured to the longitudinally extending strips 183 and 184 secured to the angle beams 19 and 20.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for cutting traveling sheet glass or the like, a cutting tool, electrically operated means for actuating said cutting tool to lower it into cutting position, a pair of feeler wheels horizontally positioned at opposite sides of the cutting tool, means for mounting said feeler wheels for vertical movement independently of one another so that they are successively raised by the traveling sheet, and means for electrically connecting said feeler wheels to said cutter actuating means in such a manner that the said cutter actuating means will not be operated until both feeler wheels have been raised by the sheet.

2. In apparatus for cutting traveling sheet glass or the like, a cutting tool, electrically operated means for actuating said cutting tool to lower it into cutting position, a pair of feeler wheels horizontally positioned at opposite sides of the cutting tool and adapted to be successively raised by the traveling sheet, means for electrically connecting said feeler wheels to said cutter actuating means in such a manner that the said cutter actuating means will not be operated until both feeler wheels have been raised by the sheet, and means for adjusting said feeler wheels horizontally relative to one another and with respect to the cutting tool.

3. In apparatus for cutting traveling sheet glass or the like, a cutting tool, electrically operated means for actuating said cutting tool to lower it into cutting position, a pair of feeler wheels horizontally positioned at opposite sides of the cutting tool and adapted to be successively raised by the traveling sheet, and means for electrically connecting said feeler wheels to said cutter actuating means including a pair of switches, one for each feeler wheel, operable so that the cutter actuating means will not be operated until both feeler wheels have been raised by the sheet to close both switches.

4. In apparatus for cutting traveling sheet glass or the like, a cutting tool, electrically operated means for actuating said cutting tool to lower it into cutting position, a pair of feeler wheels horizontally positioned at opposite sides of the cutting tool and adapted to be successively raised by the traveling sheet, means for electrically connecting said feeler wheels to said cutter actuating means including a pair of switches, one for each feeler wheel, operable so that the cutter actuating means will not be operated until both feeler wheels have been raised by the sheet to close both switches, and means for adjusting said feeler wheels horizontally relative to one another and with respect to the cutting tool.

5. In apparatus for cutting traveling sheet glass or the like, a cutting tool, electrically operated means for actuating said cutting tool to lower it into cutting position, including an electromagnet, a pair of feeler wheels horizontally positioned at opposite sides of the cutting tool and adapted to be successively raised by the traveling sheet, and means for electrically connecting said feeler wheels to said electromagnet including a switch arranged in series with the electromagnet and adapted to be closed upon raising of the feeler wheels to cause the energization of the said electromagnet.

6. In apparatus for cutting traveling sheet glass or the like, a cutting tool, electrically operated means for actuating said cutting tool to lower it into cutting position, including an electromagnet, a pair of feeler wheels horizontally positioned at opposite sides of the cutting tool and adapted to be successively raised by the traveling sheet, means for electrically connecting said feeler wheels to said electromagnet including a switch arranged in series with the electromagnet and adapted to be closed upon raising of the feeler wheels to cause the energization of the said electromagnet, and means for adjusting said feeler wheels horizontally relative to one another and with respect to the cutting tool.

7. In apparatus for cutting traveling sheet glass or the like, a cutting tool, pivotally mounted means for supporting said cutting tool, electromagnets adapted, when energized, to effect the operation of said cutter supporting means to lower the cutting tool into contact with the sheet, a pair of feeler wheels horizontally positioned at opposite sides of the cutting tool and adapted to be successively raised by the traveling sheet, and means for electrically connecting said feeler wheels to said electromagnets including a pair of switches, one for each feeler wheel, arranged in series with the electromagnets so that the said electromagnets will not be energized until both feeler wheels have been raised by the sheet.

8. In apparatus for cutting traveling sheet glass or the like, a cutting tool, pivotally mounted means for supporting said cutting tool, electromagnets adapted, when energized, to effect the operation of said cutter supporting means to lower the cutting tool into contact with the sheet, a pair of feeler wheels horizonally positioned at opposite sides of the cutting tool and adapted to be successively raised by the traveling sheet, means for electrically connecting said feeler wheels to said electromagnets including a pair of switches, one for each feeler wheel, arranged in series with the electromagnets so that the said electromagnets will not be energized until both feeler wheels have been raised by the sheet, and means for adjusting said feeler wheels horizontally relative to one another and with respect to the cutting tool.

JOHN H. MOLLER.